Sept. 20, 1955   H. R. REYNOLDS   2,718,415
SELF-LOCKING COLLAR
Filed May 4, 1949
FIG. 1.
FIG. 2.
FIG. 3.
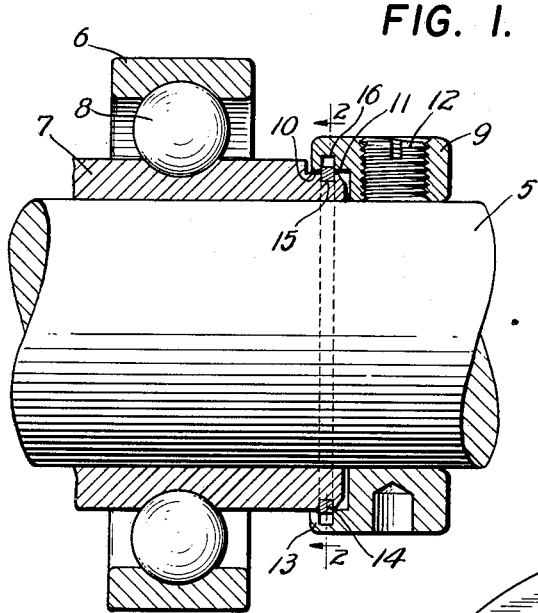
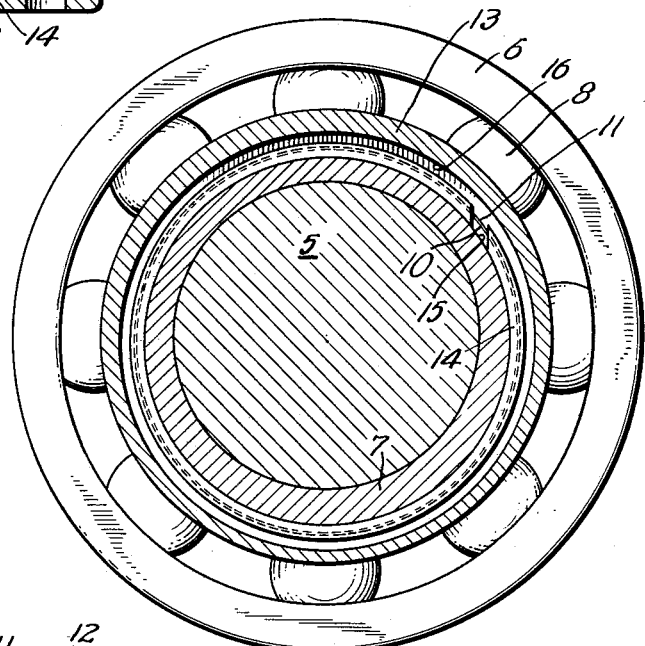
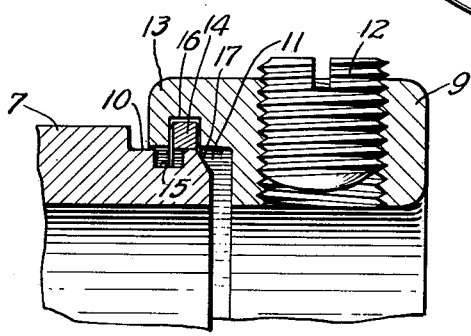
INVENTOR.
HARRY R. REYNOLDS
BY
*Mitchell Bechert*
ATTORNEYS United States Patent Office 2,718,415
Patented Sept. 20, 1955

2,718,415

SELF-LOCKING COLLAR

Harry R. Reynolds, New Britain, Conn., assignor to The Fafnir Bearing Company, New Britain, Conn., a corporation of Connecticut Application May 4, 1949, Serial No. 91,343

4 Claims. (Cl. 287—52.08)

My invention relates to a self-locking collar, and in particular to a combination including such a collar for securely binding a ring to a shaft. My present invention is in the nature of an improvement over the disclosures in my copending application, Serial No. 696,513, filed September 12, 1946, now Patent No. 2,584,740, issued February 5, 1952.

It is an object of my invention to provide an improved means for binding a ring to a shaft.

It is another object to provide, in unit-handling relation with an anti-friction bearing, a locking collar suitable for binding the inner ring to a shaft.

It is a further object to provide an improved means for locking a ring on a shaft and, at the same time, for locking said means to said ring against axial displacement therefrom.

It is a specific object to meet the above objects with a structure of utmost axial compactness, whereby savings in materials and greater adaptability may be achieved.

Other objects and various further features of the invention will be pointed out or will occur to those skilled in the art from a reading of the following specification in conjunction with the accompanying drawing. In said drawing, which shows, for illustrative purposes only, a preferred form of the invention:

Fig. 1 is a vertical sectional view of an anti-friction bearing to which locking means in accordance with the invention has been applied;

Fig. 2 is an enlarged sectional view in the radial plane designated 2—2 of Fig. 1; and Fig. 3 is an enlarged fragmentary sectional view illustrating a relation of parts during assembly thereof.

Briefly stated, my invention contemplates a ring to be secured to a shaft by means of a locking collar supported in unit-handling relation with one end of the ring. The ring and the collar are locked to the shaft by a relative rotation of eccentrically formed interfitting surfaces on the collar and the ring. In addition, means in the form of a snap ring engaging ring-locating means, such as eccentric grooves, in these eccentric surfaces may hold the collar and the ring in unit-handling relation prior to assembly on a shaft. The snap ring may be employed only for axial securing purposes, and it may have a radial clearance relation with one or with both of the grooves.

Referring to the drawing, my invention is shown in application to an anti-friction bearing to be secured to the shaft 5. The bearing may include an outer race ring 6 and a so-called wide inner race ring 7, with antifriction elements 8 between the rings 6—7. A collar 9 may also ride the shaft 5, and the collar 9 may be employed in securing the inner ring 7 to the shaft 5. Such securing may be achieved by a radial bind resulting from an interlock between an eccentrically formed convex cylindrical surface 10 at the end of the inner ring 7 and a similar eccentrically formed but concave surface 11 within an axially projecting part 13 of the collar 9. It will be understood that the radial bind may be achieved upon relative rotation of the inner ring 7 and of the locking collar 9; this relative rotation may, if desired, be automatically accomplished after the set screw 12 has been tightened against the shaft and the shaft has been rotated, the inherent "creeping" of the inner ring 7 on the shaft 5 being sufficient to effect the initial relative rotation required for binding the eccentric lock. Alternatively, the parts may be locked upon a manual relative rotation, as will be clear.

In accordance with the invention, I provide means for axially locating or for holding in unit-handling relation the collar 9 and the ring 7 prior to assembling on a shaft. Such means may be effective between the two eccentric surfaces 10 and 11, without requiring any greater axial length or overlap than would be required to effect the described eccentric locking.

For this purpose, I have employed a snap ring 14 which may be generally circular and which is to be held within a locating means, such as an eccentric groove, in one of the overlapping eccentric surfaces 10 and 11. In the form shown, the snap ring 14 is, in its normal unstressed condition, characterized by radial dimensions causing it to seat on the inner groove, that is, on a radially inwardly directed groove 15 in the convex eccentric surface 10 on the inner ring 7. The depth of groove 15 is preferably less than the radial thickness of the snap ring 14 in order that the snap ring 14 may project for axial abutment with the walls of further locating means, such as a groove 16, radially overstanding the groove 15 and formed in the eccentric surface 11. The depth of the groove 16 is preferably at least substantially the radial thickness of the ring 14, and for ease of machining I prefer that the groove 16 have the same degree of eccentricity as the other described eccentric surfaces and grooves.

In the assembly operation, the snap ring 14 must be radially stressed in order to clear and ride on the eccentric surface 10 before snapping into its final assembled position in the groove 15. In order to assist in stressing the snap ring 14, I may employ cooperating camming surfaces effective between the bearing ring 7 and the snap ring 14, and in the form shown I have appropriately chamfered the end of the inner bearing ring, as shown at 17; the chamfer 17 is preferably characterized by the same eccentricity as the locking surface 10 and the groove 15. After the snap ring 14 (within groove 16) has been forced up the cam 17 and onto the outer part of the cylindrical surface 10, it will snap into groove 15, and the assembly will be permanently unit-handling, ready for installation on a shaft.

It will be clear that I have described a relatively simple and yet highly effective means for locking a ring to a shaft. Such locking means may be effective to hold the parts in unit-handling relation prior to assembly to a shaft. It will further be noted that my effective locking and holding may be achieved with a minimum of axial overlap of parts and, therefore, with a minimum consumption of space and of material.

While I have described my invention in detail for the preferred form shown, it will be understood that modifications may be made within the scope of the invention as defined in the appended claims.

I claim:

1. In combination, a bearing including an inner ring having a bore to fit a shaft, a locking collar having a bore to fit said shaft, siad ring and collar having axially overlapping concave and convex locking surfaces that are eccentric with respect to the respective bores of said ring and collar, said ring and collar further having radially registering ring-receiving grooves adjacent said surfaces, said grooves being eccentric with respect to the bores of said ring and collar and being concentric with said locking surfaces, and a snap ring seated in one of said grooves and extending radially into the other of said grooves, whereby said snap ring may be eccentrically carried and may therefore be of minimum radial thickness and yet provide circumferentially uniformly distributed axial retention of said ring and collar with minimum localized weakening of either said ring or collar at said grooves.

2. In a bearing according to claim 1, one of said grooves being of a radial depth at least as great as the radial thickness of said snap ring, whereby an assembly of said elements is facilitated.

3. In a bearing according to claim 1, one of said grooves being of a radial depth less than the radial thickness of said snap ring, whereby upon assembly said snap ring may snap into the bottom of said one groove and project into axial locking relation with the other groove.

4. A bearing according to claim 2, in which the end of one of said eccentric surfaces is formed with an eccentric chamfer for camming engagement with said snap ring in order radially to stress said snap ring upon assembly.

References Cited in the file of this patent

UNITED STATES PATENTS

| | | |
|---|---|---|
| 738,503 | Waters | Sept. 8, 1903 |
| 827,267 | Schmidt | July 31, 1906 |
| 843,906 | Murchie | Feb. 12, 1909 |
| 1,526,008 | Olson | Feb. 10, 1925 |
| 1,561,443 | Searles | Nov. 10, 1925 |
| 1,588,993 | Rahn | June 15, 1926 |
| 1,891,460 | Vlahek | Dec. 20, 1932 |
| 2,222,334 | Brouwer | Nov. 19, 1940 |
| 2,226,524 | Runge | Dec. 24, 1940 |
| 2,273,379 | Searles | Feb. 17, 1942 |
| 2,584,740 | Reynolds | Feb. 5, 1952 |